(12) United States Patent
Kanakubo

(10) Patent No.: US 7,733,072 B2
(45) Date of Patent: Jun. 8, 2010

(54) STEP-DOWN/STEP-UP DC/DC CONVERTER APPARATUS AND METHOD WITH INDUCTOR CURRENT THRESHOLD VALUE ADJUSTING

(75) Inventor: Yoshihide Kanakubo, Yokohama (JP)

(73) Assignee: Texas Instruments Incorporated, Dallas, TX (US)

( * ) Notice: Subject to any disclaimer, the term of this patent is extended or adjusted under 35 U.S.C. 154(b) by 464 days.

(21) Appl. No.: 11/845,548

(22) Filed: Aug. 27, 2007

(65) Prior Publication Data

US 2009/0059626 A1 Mar. 5, 2009

(51) Int. Cl.
*G05F 1/59* (2006.01)
(52) U.S. Cl. .................. 323/271; 323/222; 323/284; 323/285; 323/299
(58) Field of Classification Search .......... 323/222, 323/271, 284, 285, 299
See application file for complete search history.

(56) References Cited

U.S. PATENT DOCUMENTS

| 4,618,812 A * | 10/1986 | Kawakami | 323/224 |
|---|---|---|---|
| 4,814,685 A * | 3/1989 | Renger | 323/224 |
| 4,958,121 A * | 9/1990 | Cuomo et al. | 323/224 |
| 5,602,463 A * | 2/1997 | Bendall et al. | 323/266 |
| 5,734,258 A * | 3/1998 | Esser | 323/224 |
| 5,831,418 A * | 11/1998 | Kitagawa | 323/222 |
| 6,636,431 B2 * | 10/2003 | Seki et al. | 363/65 |
| 6,788,033 B2 * | 9/2004 | Vinciarelli | 323/225 |
| 6,977,488 B1 * | 12/2005 | Nogawa et al. | 323/271 |
| 7,116,085 B2 * | 10/2006 | Ikezawa | 323/225 |
| 7,135,843 B2 * | 11/2006 | Ikezawa | 323/282 |

* cited by examiner

*Primary Examiner*—Jeffrey L Sterrett
(74) *Attorney, Agent, or Firm*—William B. Kempler; Wade J. Brady, III; Frederick J. Telecky, Jr.

(57) ABSTRACT

The invention provides a switching power supply device that can restrain the variation in the ripple of the output voltage corresponding to the variation in the input voltage and a control device thereof. When output voltage Vout is higher than a target value, switching converter circuit 10 is set to a second state (a state of discharging the power stored in inductor L1 to terminal To). When output voltage Vout is lower than the target value, switching converter circuit 10 is set to a first state (a state of storing the power input from terminal Ti in inductor L1) for a prescribed period of time and is then returned to the second state. Also, when the current flowing through inductor L1 exceeds a threshold value, switching converter circuit 10 is set to the second state. In addition, the threshold value of the inductor current is adjusted corresponding to the ratio between input voltage Vin and output voltage Vout, so that the variation in the ripple of output voltage Vout occurring together with the variation in that ratio can be restrained.

14 Claims, 4 Drawing Sheets

STEP-DOWN/STEP-UP DC/DC CONVERTER APPARATUS AND METHOD WITH INDUCTOR CURRENT THRESHOLD VALUE ADJUSTING

FIELD OF THE INVENTION

The present invention relates to a switching power supply device and a control device thereof. In particular, the present invention relates to a DC-DC type switching power supply device that controls the output voltage using a PFM (pulse frequency modulation) method.

BACKGROUND OF THE INVENTION

A portable electronic device is often equipped with a DC-DC converter used to convert the voltage generated by a battery to a power supply voltage used for an electronic circuit.

The voltage of the battery varies corresponding to its remaining capacity. For example, the voltage of a lithium ion battery may vary in the range of 3-4.2 V. Also, if an external power supply, such as an AC adapter, is used without using an incorporated battery, a voltage about 5 V may be input instead of the voltage of the battery. A DC-DC converter can generate a constant output voltage in spite of variation in the input voltage.

DC-DC converters are usually classified into three types—a step-down type, a step-up type, and a step-down/step-up type. The step-down type is used when the lower limit of the input voltage is higher than the target value of the output voltage. The step-up type is used when the upper limit of the input voltage is lower than the target value of the output voltage. The step-up/step-down type is used when the input voltage is higher or lower than the output voltage.

In order to reduce the power consumption of a battery in a portable electronic device, a standby mode is often adopted that can stop operation of at least part of the circuit when the device is not in use. Since the load of the DC-DC converter is very low in the standby mode, a PFM (pulse frequency modulation) method can be used to save more power than a PWM (pulse width modulation) method that performs switching constantly at a certain period. Japanese Kokai Patent Application Publication No. JP 11[1999]-235023 discloses a PFM type switching power supply device. That publication describes technology for reducing the ripple voltage when the power supply voltage is high, by making the power supply voltage dependent on the duty ratio of the PFM.

In a DC-DC converter, a voltage corresponding to the difference between the input voltage and the output voltage is usually applied to an inductor used for performing an energy converting operation. In the PFM method, the duration for applying the voltage to the inductor in one cycle of switching operation is fixed, and the output voltage is controlled by varying the repetition period of that fixing period. However, if the input voltage varies with the output voltage kept constant, the potential difference between input and output will vary, and the voltage applied to the inductor will vary. In the case of the PFM method, since the time of application of the voltage to the inductor is fixed, if the voltage changes, the variation rate of the current flowing through the inductor over time will vary, and the amplitude of the ripple in the output voltage will vary. For example, when the voltage difference between the input and output is increased, the voltage applied to the inductor is increased, and the variation rate of the current flowing through the inductor over time is increased. Therefore, when the application time of the voltage to the inductor is fixed, if the voltage difference between the input and output is increased, the ripple in the output voltage will increase. In other words, in a PFM-type DC-DC converter, the ripple in the output voltage varies significantly corresponding to the input voltage. This is a problem.

In recent years, the power supply voltage for electronic circuits has tended to become lower and lower. Since ripple in the power supply voltage has a significant influence on the reliability of the device, stricter control of the ripple voltage is desired.

An objective of the present invention is to address the aforementioned problems by providing a switching power supply device and a control device therefor which can control the variation of ripple in the output voltage corresponding to the variation in input voltage.

SUMMARY OF THE INVENTION

In accordance with one aspect of the invention, a switching power supply device is provided that has a switching converter circuit, a control circuit, and a threshold value adjusting circuit.

In one embodiment, the switching converter circuit includes at least one inductor and alternately repeats a first state for storing the power input from the input terminal in the inductor and a second state for discharging the power stored in the inductor from the output terminal, and steps up or down the DC voltage applied to the input terminal as a result of the repeated operation and outputs that voltage from that output terminal. The control circuit sets the switching converter circuit in the second state when the voltage at the output terminal is higher than a target value and returns the switching converter circuit to the second state after it has been set in the first state for a prescribed period of time when the voltage at the output terminal is lower than the target value and sets the switching converter circuit in the second state when the current of the inductor is larger than a threshold value. The threshold value adjusting circuit adjusts the threshold value corresponding to the ratio or difference between the voltage at the input terminal and the voltage at the output terminal, so that the variation in the ripple voltage occurring at the output terminal in company with the variation in the ratio or difference is reduced.

In another aspect, the invention provides a control device for the switching converter circuit. The control device includes a control circuit and a threshold value adjusting circuit.

The switching power supply device and the control device may also have a first judging circuit for determining whether the current of the inductor is larger than the threshold value corresponding to an input threshold value signal.

Also, the threshold value adjusting circuit may include a first voltage dividing circuit that divides the voltage at the input terminal based on plural voltage dividing ratios, a comparator that compares each of the plural voltages divided by the first voltage dividing circuit with the voltage at the output terminal or a prescribed voltage, and a signal generating circuit that generates the threshold value signal based on the comparison result of the comparator.

Also, the switching power supply device and the control device may include a second judging circuit that determines whether the voltage at the output terminal is lower than the target value.

The control circuit may include a signal holding circuit, which holds the signal with a first value when it is found by the first judging circuit that the voltage at the output terminal is lower than the target value and resets that signal to a second value periodically in synchronization with an input clock signal, and a control signal generating circuit used for generating a control signal, which sets the switching converter circuit to the first state when the signal holding circuit holds a signal with the first value and sets the switching converter circuit to the second state when the signal holding circuit holds a signal with the second value.

The signal holding circuit can hold the second value during the period until the reset operation is performed at least once when it is found by the first judging circuit that the current of the inductor is larger than the threshold value.

DESCRIPTION OF THE EMBODIMENTS

According to the present invention, control is performed to release the power stored in the inductor when the current flowing through the inductor of the switching converter circuit increases. The variation in the ripple of the output voltage corresponding to the variation in the input voltage can be restrained by adjusting the threshold value of the inductor current set for said control corresponding to the ratio or difference between the input voltage and the output voltage.

Figure 1:
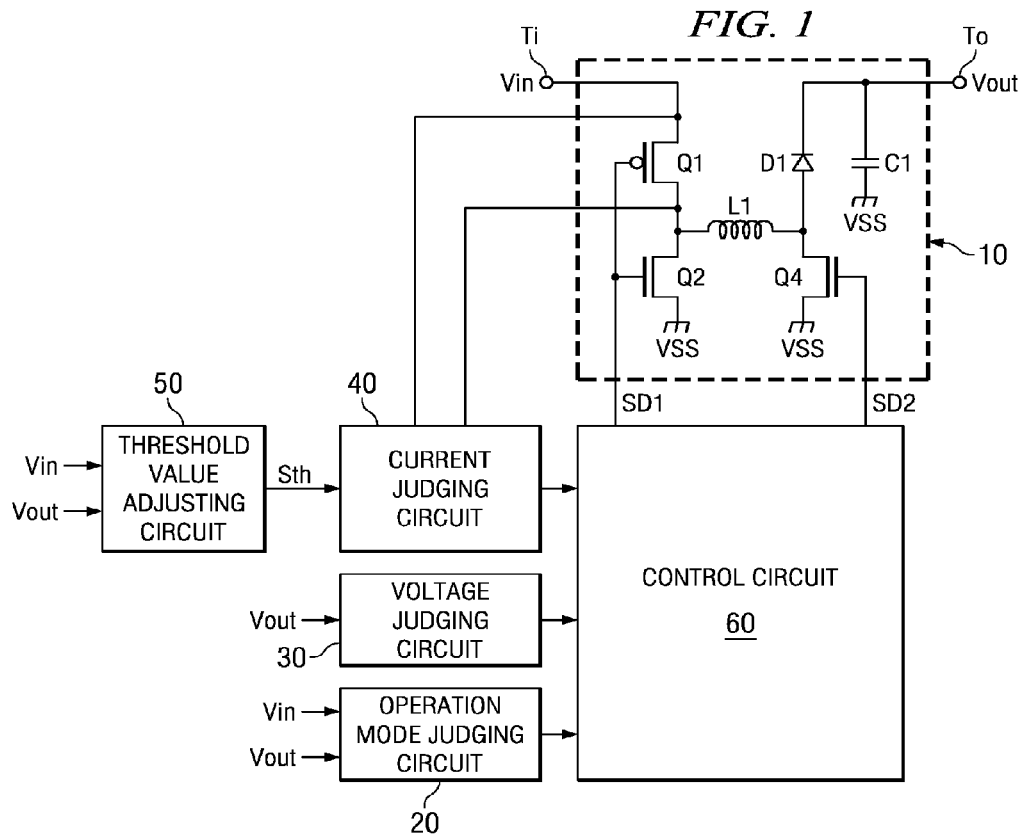
FIG. 1 is a diagram illustrating an example of the configuration of the switching power supply device disclosed in the embodiment of the present invention.
Figure 3:
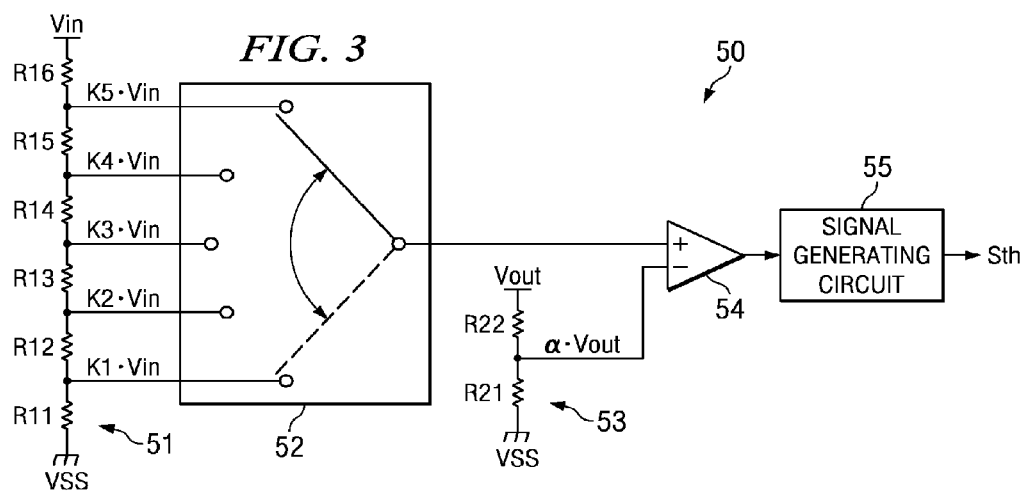
FIG. 3 is a diagram illustrating an example of the configuration of the threshold value adjusting circuit.
Figure 2:
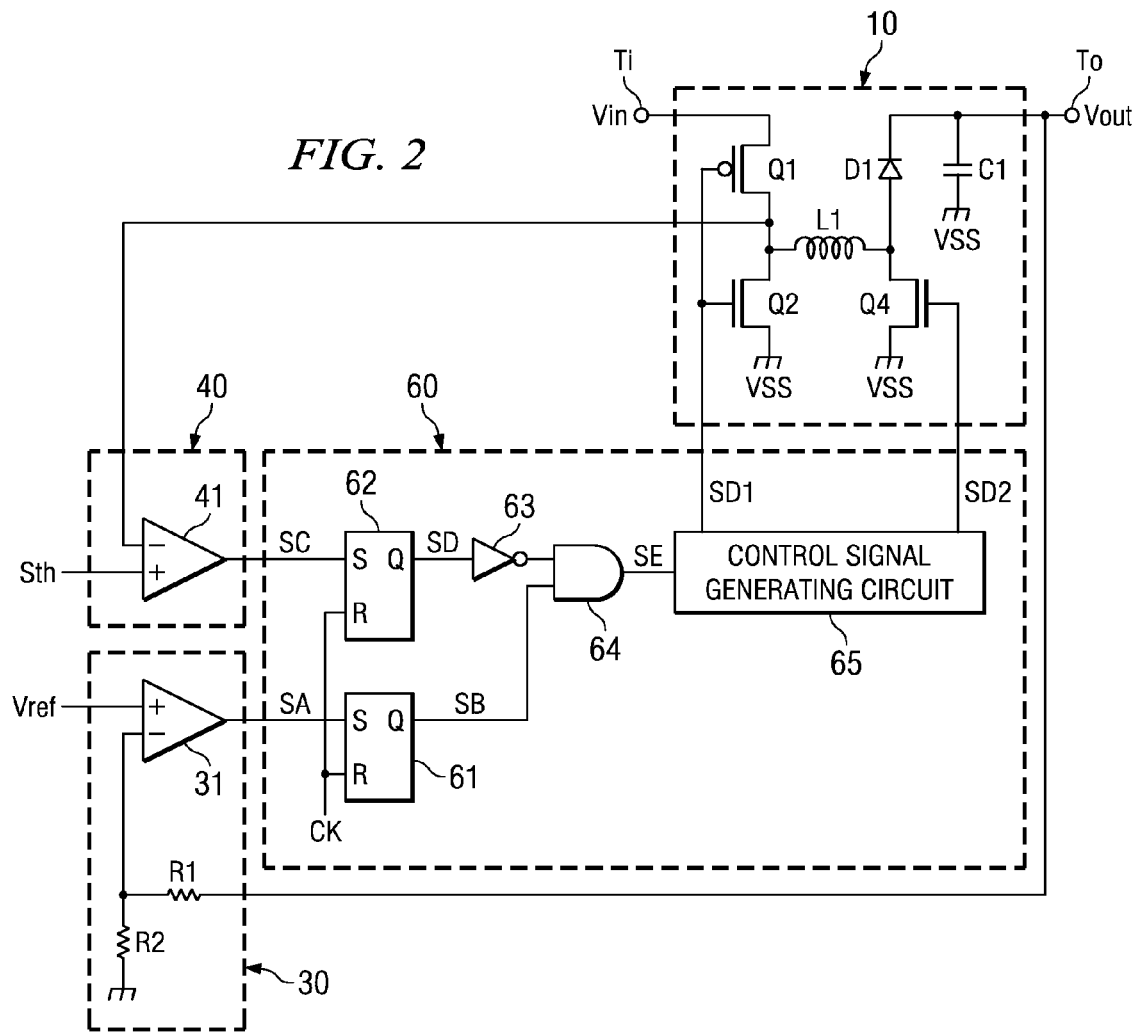
FIG. 2 is a diagram illustrating an example of the configuration of the voltage judging circuit, current judging circuit, and control circuit.

An example embodiment for a switching power supply device implementing principles of the invention is described with reference to FIGS. 1-3. As seen in FIG. 1, the illustrated switching power supply device has a switching converter circuit 10, an operation mode judging circuit 20, a voltage judging circuit (second judging circuit) 30, a current judging circuit (first judging circuit) 40, a threshold value adjusting circuit 50, and a control circuit 60, connected as shown. FIG. 2 shows an example implementation for the configuration of the voltage judging circuit 30, current judging circuit 40, and control circuit 60 of FIG. 1. FIG. 3 shows an example implementation for the configuration of the threshold value adjusting circuit 50.

Switching converter circuit 10 steps up or down the voltage Vin input to terminal Ti by means of a switching operation, and outputs the voltage as voltage Vout from terminal To. Switching converter circuit 10 includes at least one inductor. It steps up or down voltage Vin by alternately repeating the state of storing the power input from terminal Ti in the inductor (first state) and the state of releasing the power stored in the inductor from terminal To (second state).

As shown in FIG. 1, switching converter circuit 10 has an inductor L1, a p-type MOS transistor Q1, n-type MOS transistors Q2, Q4, a diode D1, and a capacitor C1 for smoothing the output. The source of MOS transistor Q1 is connected to terminal Ti, and its drain is connected to one of the terminals of inductor L1. The source of MOS transistor Q2 is connected to reference potential VSS and its drain is connected to one terminal of inductor L1 and to the drain of MOS transistor Q1. The cathode of diode D1 is connected to terminal To, and its anode is connected to the other terminal of inductor L1. The source of MOS transistor Q4 is connected to reference potential VSS, and its drain is connected to the other terminal of inductor L1. Capacitor C1 is connected between output terminal To and reference potential vss.

Figure 4A:
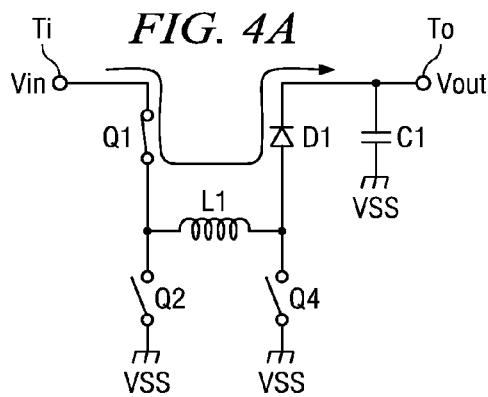
FIGS. 4A and 4B are diagrams helpful in explaining the step-down operation of the switching converter circuit.
Figure 4B:
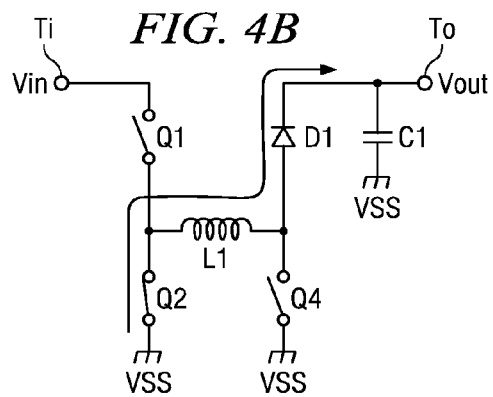

Switching converter circuit 10 shown in FIG. 1 can step up/down voltage. When stepping down voltage, MOS transistor Q4 is kept constantly off, while MOS transistors Q1, Q2 are controlled in on/off states complementarily (FIGS. 4A, 4B). When stepping up the voltage, MOS transistor Q1 is kept constantly on, MOS transistor Q2 is kept constantly off, and MOS transistor Q4 is controlled in on/off states (FIG. 5).

Operation mode judging circuit 20 determines the mode (step up, step down) in which switching converter circuit 10 will operate, based on input voltage Vin and output voltage Vout. In other words, if input voltage Vin is higher than output voltage Vout, the operation mode is judged as the step-down operation mode. If input voltage Vin is lower than output voltage Vout, the operation mode is judged as step-up operation mode.

Voltage judging circuit 30 determines whether the voltage at output terminal To is lower than a prescribed target value. For example, voltage Vout at terminal To is detected and compared with the target value, generating an output signal SA which has a high level if voltage Vout is lower than the target value and has a low level if the voltage is higher than the target value. As shown in the example implementation of FIG. 2, voltage judging circuit 30 may have a comparator 31 and resistors R1, R2. Resistors R1 and R2 are connected in series between terminal To and reference potential VSS to divide output voltage Vout. A comparator 31 compares the voltage generated at the connection point between resistors R1 and R2 with a reference voltage Vref. The comparison result is output as the signal SA. In other words, signal SA with high level is output if the voltage at the connection point is lower than reference voltage Vref, and signal SA with low level is output if the voltage is higher than reference voltage Vref.

Current judging circuit 40 determines whether the current flowing through inductor L1 of switching converter circuit 10 is larger than a prescribed threshold value corresponding to threshold value signal Sth. For example, the voltage at the connection point between MOS transistor Q1 and one of the terminals of inductor L1 is detected, and the detected voltage is compared with the threshold value signal Sth. The voltage at that connection point drops when a current flows through MOS transistor Q1. As a result, corresponding to the comparison result, an output signal SC is provided that has a high level when the current flowing through inductor L1 is higher than the prescribed threshold value and has a low level when the current is lower than the prescribed threshold value.

As shown in FIG. 2, current judging circuit 40 may be implemented by means of a comparator 41. Comparator 41 compares the voltage at the connection point between MOS transistor Q1 and one of the terminals of inductor L1 with threshold value signal Sth and outputs the comparison result as signal SC. In other words, if the output signal of comparator 41 is lower than threshold value signal Sth, signal SC with high level is output. If it is higher than threshold value signal Sth, signal SC with low level is output.

Control circuit 60 controls the switching operation of switching converter circuit 10. For example, control part 60 determines the operation mode (step up, step down) based on the judgment result of operation mode judging circuit 20 and controls switching converter circuit 10 according to a prescribed control sequence in the determined mode. In other words, the gates of MOS transistors Q1-Q4 are driven according to a control sequence determined for each operation mode so that output voltage Vout approaches the prescribed target value. If it is found by voltage judging circuit 30 that voltage Vout at terminal To is higher than the target value, control circuit 60 controls switching converter circuit 10 to enter the state in which the power stored in inductor L1 is released from terminal To (second state). On the other hand, if it is found by voltage judging circuit 30 that voltage Vout at terminal To is lower than the target value, the control circuit 60 controls switching converter circuit 10 to enter the state for storing the power input from terminal Ti in inductor L1 (first state). After that state is retained for a prescribed period of time, switching converter circuit 10 is returned to the second state.

According to the aforementioned control arrangement, if the voltage Vout at terminal To is lower than the target value, a voltage is applied to inductor L1 for a prescribed period of time. After the prescribed period of time has lapsed, the power stored in inductor L1 is released from terminal To. In other words, a PFM type switching operation that varies the period for repeating storage and release of power in inductor L1 corresponding to the deviation of voltage Vout from the target value is realized. Also, if it is found by current judging circuit 40 that the current of inductor L1 is larger than the threshold value set by threshold value signal Sth, control part 60 will set switching converter circuit 10 into said second state to release the power stored in inductor L1 to terminal To.

As shown in FIG. 2, control part 60 has latch circuits 61, 62, inverter circuit 63, AND circuit 64, and control signal generating circuit 65. Latch circuit 61 keeps output signal SB at high level when signal SA of voltage judging circuit 30 rises from low level to high level with clock signal CK on low level. When clock signal CK becomes high level, output signal SB is reset to low level. Latch 62 keeps output signal SD on high level when signal SC of current judging circuit 40 rises from low level to high level with clock signal CK on low level. When clock signal CK becomes high level, output signal SD is reset to low level. Inverter circuit 63 performs logic inversion to the output signal SD of latch circuit 62. AND circuit 64 outputs the logic product of output signal SB of latch circuit 61 and the output signal of inverter circuit 63 as signal SE.

The latch circuits 61, 62, inverter circuit 63, and AND circuit 64 constitute a circuit (signal holding circuit) that holds signal SE corresponding to the judgment results of voltage judging circuit 30 and current judging circuit 40. In other words, the signal holding circuit keeps signal SE on high level when it is found by voltage judging circuit 30 that voltage Vout at terminal To is lower than the target value. Also, signal SE is reset to low level periodically in synchronization with clock signal CK. When it is found by current judging circuit 40 that the current of inductor L1 is larger than the threshold value, signal SE is kept on low level during a period when said periodic reset operation is performed at least once.

Control signal generating circuit 65 generates a control signal that sets switching converter circuit 10 to the first state (the state of inputting power from terminal Ti to inductor L1) when signal SE is on high level, and sets switching converter circuit 10 to the second state (the state of releasing the power stored in inductor L1 to terminal To) when signal SE is on low level. For example, if the judgment result of operation mode judging circuit 20 is the step-down operation mode, control signal generating circuit 65 sets signal SD2 supplied to the gate of MOS transistor Q4 to low level to turn off MOS transistor Q4. In this case, if signal SE is on high level, signal SD1 supplied to the gates of MOS transistors Q1 and Q2 are set to low level to turn on MOS transistor Q1 and turn off MOS transistor Q2. If signal SE is on low level, signal SD1 is set to high level to turn off MOS transistor Q1 and turn on MOS transistor Q2. On the other hand, if the judgment result of operation mode judging circuit 20 is the step-up operation mode, control signal generating circuit 65 sets signal SD1 to low level to turn on MOS transistor Q1 and turn off MOS transistor Q2. In this case, if signal SE is on high level, signal SD2 is set to high level to turn on MOS transistor Q4. If signal SE is on low level, signal SD2 is set to low level to turn off MOS transistor Q4.

Corresponding to the ratio between input voltage Vin and output voltage Vout, threshold value adjusting circuit 50 adjusts threshold value signal Sth such that the variation in the ripple voltage at terminal To occurring in company with the variation in said voltage ratio is reduced. If the difference between input voltage Vin and output voltage Vout is increased (voltage ratio is at a distance from "1"), the voltage applied to inductor L1 in switching converter circuit 10 is increased, and the variation rate of the current flowing through inductor L1 over time is increased. In this case, the time of keeping switching converter circuit 10 in the first state will not be very short by increasing the threshold value of current judging circuit 40, for example. On the other hand, if the difference between input voltage Vin and output voltage Vout is reduced (voltage ratio approaches "1"), the variation rate of the current flowing through inductor L1 over time is reduced. Therefore, in this case, the time of keeping switching converter circuit 10 in the first state will not be very long by reducing the threshold value of current judging circuit 40, for example.

Threshold value adjusting circuit 50 restrains the variation in the ripple voltage at terminal To by adjusting threshold value signal Sth corresponding to the voltage ratio between input voltage Vin and output voltage Vout. For example, as shown in FIG. 3, threshold value adjusting circuit 50 has voltage dividing circuits 51, 53, selecting circuit 52, comparator 54, and signal generating circuit 55. Voltage dividing circuit 51 divides input voltage Vin according to five voltage dividing ratios K1-K5. For example, as shown in FIG. 3, the voltage dividing circuit comprises six resistors (R11, . . . , R16) connected in series between terminal Ti and reference potential VSS. The divided voltages (K1·Vin, . . . , K5·Vin) are generated at connection points of resistors R11-R16. Voltage dividing circuit 53 divides output voltage Vout according to a voltage dividing ratio $\alpha$. For example, as shown in FIG. 3, said voltage dividing circuit comprises two resistors (R22, R23) connected in series between terminal To and reference potential VSS. The separated voltage ($\alpha$·Vout) is generated at the connection point between resistors R22 and R23. Selecting circuit 52 selects and outputs one voltage sequentially from voltages divided by voltage dividing circuit 51 (K1·Vin, . . . , K5·Vin). Comparator 54 sequentially compares the output voltage of voltage dividing circuit 51 selected by selecting circuit 52 with the output voltage ($\alpha$·Vout) of voltage dividing circuit 53.

Signal generating circuit 55 generates threshold value signal Sth based on the comparison result of comparator 54 corresponding to each of voltages (K1·Vin, . . . , K5·Vin) divided by voltage dividing circuit 51. In other words, signal generating circuit 55 obtains the result of comparator 54 of comparing voltage $\alpha$·Vout output from voltage dividing circuit 53 with each of voltages K1·Vin, . . . , K5·Vin output from selecting circuit 52 and generates threshold value signal Sth based on the five comparison results. For example, if the output voltage $\alpha$·Vout of voltage dividing circuit 53 is larger than K1·Vin, K2·Vin but smaller than K3·Vin, K4·Vin, K5·Vin, the voltage ratio between the input and output voltages Vout/Vin is included in the range from K2/$\alpha$ to K3/$\alpha$.

Consequently, signal generating circuit 55 generates a prescribed threshold value signal Sth corresponding to the range of said voltage ratio. Signal generating circuit 55 can be constituted by using a latch circuit that holds said five comparison results output from comparator 54 as binary codes, a data converter circuit that converts the binary codes held in the latch circuit into a binary threshold value data, and an digital/analog converter that converts the threshold value data output from the data converting circuit into an analog threshold value signal Sth.

The operation of the switching power supply device disclosed in the embodiment having the above configuration is now described. First, the step-up/down operation of switching converter circuit 10 is explained. FIGS. 4A and 4B show the state of each transistor in switching converter circuit 10 during a step-down operation. As shown in FIGS. 4A and 4B, MOS transistor Q4 is kept constantly off. MOS transistors Q1 and Q2 are turned on and off complementarily. When MOS transistor Q1 is turned on and MOS transistor Q2 is turned off (FIG. 4A), terminal Ti is connected to terminal To via inductor L1. Since the potential at terminal Ti is higher than that at terminal To in a step-down operation, diode D1 is biased in the forward direction and is on. When diode D1 is on, a voltage corresponding to the difference between input voltage Vin and output voltage Vout is applied to inductor L1, and power input from terminal Ti is stored (first state). On the other hand, when MOS transistor Q2 is turned on and MOS transistor Q1 is turned off (FIG. 4B), inductor L1 is cut off from terminal T1 and is connected to reference potential VSS. In this way, the power stored in inductor L1 is released to capacitor C1 via diode D1 (second state).

Figure 5A:
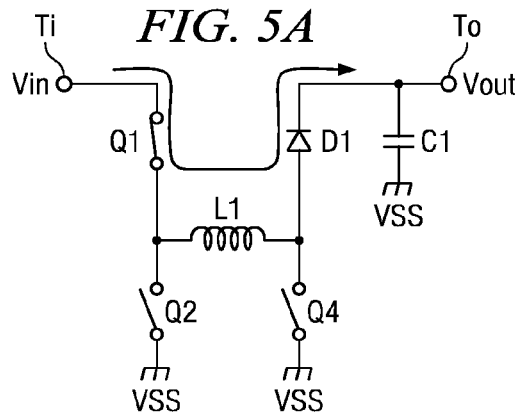
FIGS. 5A and 5B are diagrams helpful in explaining the step-up operation of the switching converter circuit.
Figure 5B:
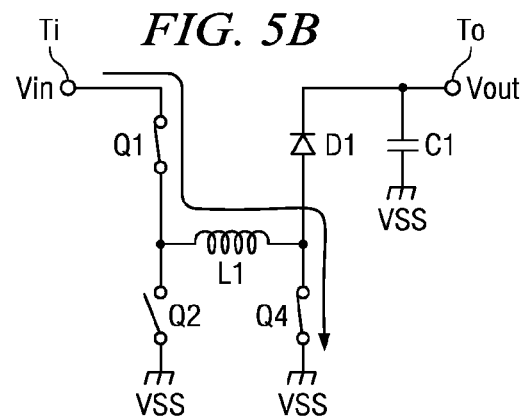
Figure 6A:
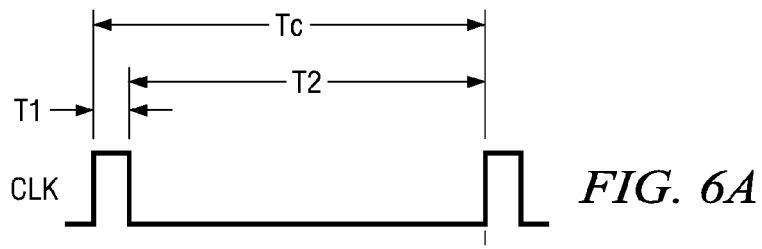
FIG. 6 is a diagram illustrating an example of the timing relationship between the various signals in the control circuit.
Figure 6B:
Figure 6C:
Figure 6D:
Figure 6E:
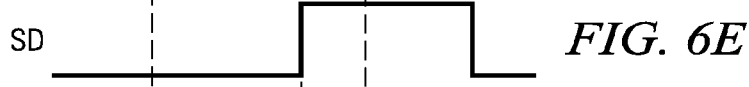
Figure 6F:

FIGS. 5A and 5B shows the state of each transistor in switching converter circuit 10 during a step-up operation. As shown in FIGS. 5A and 5B, MOS transistor Q1 is kept constantly on, and MOS transistor Q2 is kept constantly off during a step-up operation. When MOS transistor Q4 is on (FIG. 5B), inductor L1 is connected between terminal Ti and reference potential VSS. As a result, input voltage Vin is applied to inductor L1, and the power input from terminal Ti is stored (first state). On the other hand, when MOS transistor Q4 is turned off (FIG. 5A), inductor L1 is cut off from reference potential VSS and is connected to terminal To via diode D1. As a result, the power stored in inductor L1 is released to capacitor C1 via diode D1 (second state).

The control over switching converter circuit 10 by control circuit 60 is now described. FIG. 6 is a diagram illustrating an example of the timing relationship between the various signals in control circuit 60. Clock signal CLK (designated (A) in FIG. 6) repeats high level (time T1) and low level (time T2) at a certain period Tc. If output voltage Vout is lower than the target value and the output signal SA (designated (B) in FIG. 6) of voltage judging circuit 30 becomes high level at time t1, signal SB with high level (designated (C) in FIG. 6) is held in latch circuit 61. At that time, signal SD with low level (designated (E) in FIG. 6) is held in latch circuit 62, and the output signal SE (designated (F) in FIG. 6) of AND circuit 64 becomes high level. When signal SE switches to high level, switching converter circuit 10 is set in the first state by control signal generating circuit 65. The power input from terminal Ti is stored in inductor L1. Next, when the voltage at one of terminals of inductor L1 at time t2 is lower than the threshold value set by threshold value signal Sth, the output signal SC (designated (D) in FIG. 6) of current judging circuit 40 switches to high level, and signal SD with high level is held in latch circuit 62. As a result, the output signal SE of AND circuit 64 switches to low level, and switching converter circuit 10 is set to the second state.

When switching converter circuit 10 is set in the second state, since the power stored in inductor L1 is released, the current of inductor L1 is reduced, the voltage at one of the terminals of inductor L1 is raised, and said voltage becomes higher than threshold value signal Sth. Consequently, the output signal SC of current judging circuit 40 switches to low level immediately after time t2 (at t3). However, even if signal SC switches to low level, since the signal SD of latch circuit 62 is held on high level, switching converter circuit 10 is kept in the second state. When clock signal CK switches to high level in that state, the signal SD of latch circuit 62 is reset to low level. After that, the aforementioned operation is repeated.

According to this embodiment, as described above, when voltage Vout at terminal To is higher than the target value, switching converter circuit 10 is set in the second state (the state of releasing the power stored in inductor L1 to terminal To). When voltage Vout at terminal To is lower than the target value, switching converter circuit 10 is set in the first state (the state of storing power input from terminal Ti in inductor L1) for a prescribed period of time and is then returned to the second state. Also, if the current of inductor L1 exceeds the prescribed threshold value, switching converter circuit 10 is set to the second state. Also, the aforementioned threshold value with respect to the current of inductor L1 is adjusted such that the variation in the ripple of output voltage Vout occurring in company with the variation in the ratio between input voltage Vin and output voltage Vout is restrained corresponding to said ratio. Consequently, even if there is variation in the input voltage (for example, a drop in the voltage of the battery) in the switching converter circuit whose output voltage is controlled using the PFM method, the variation in the ripple of the output voltage can be restrained to a very low level.

In this way, for a switching power supply device accommodated in a device for which variation in the input voltage is inevitable (portable electronic device operating on a battery), the accuracy of the output voltage can be kept constantly so that the reliability of the device can be improved.

Modified examples of the threshold value adjusting circuit are now described.

Figure 7:
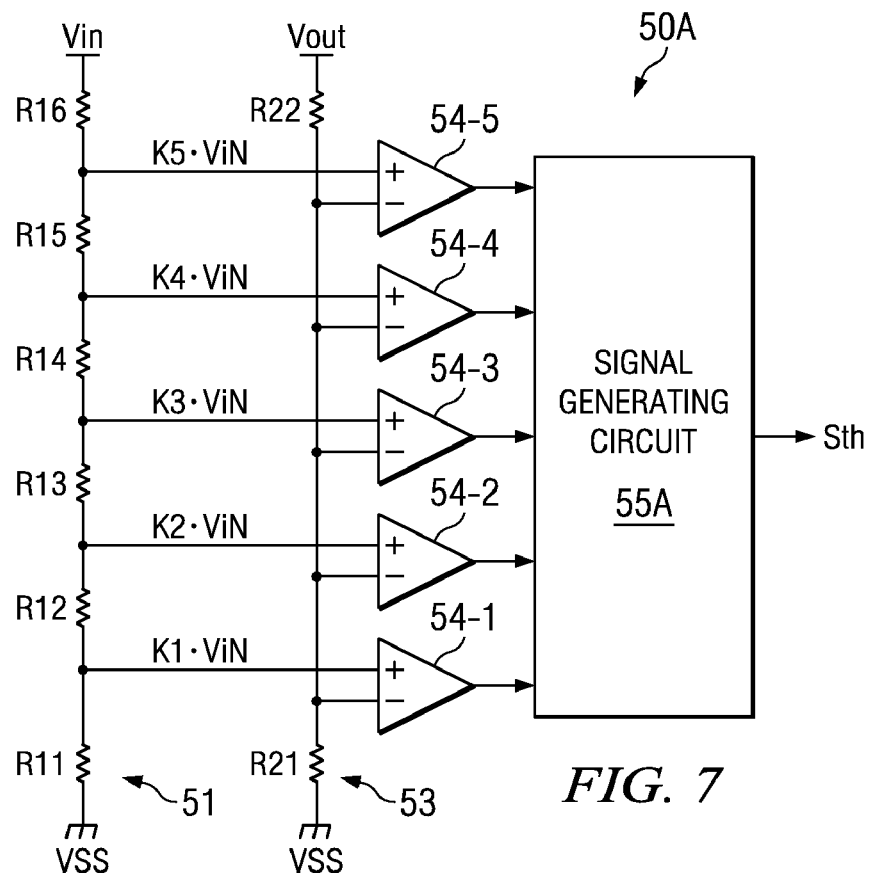
FIG. 7 is a diagram illustrating a first modification example of the threshold value adjusting circuit.

FIG. 7 shows a first example of modification of the threshold value adjusting circuit. In threshold value adjusting circuit 50 shown in FIG. 3, one voltage is selected sequentially from voltages K1·Vin, . . . , K5·Vin output from voltage dividing circuit 51 and is input into comparator 54. However, it is also possible to uses comparators 54-1, . . . , 54-5 corresponding to the voltages K1·Vin, . . . , K5·Vin as shown in FIG. 7.

Threshold value adjusting circuit 50A shown in FIG. 7 has voltage dividing circuits 51, 53, comparators 54-1, . . . , 54-5, and signal generating circuit 55A. Voltage dividing circuits 51, 53 are the same as those represented by the same symbols in FIG. 3. Comparators 54-1, . . . , 54-5 compare the voltages K1·Vin, . . . , K5·Vin output from voltage dividing circuit 51 with voltage α·Vout output from voltage dividing circuit 52, respectively. Signal generating circuit 55A generates threshold value signal Sth based on the comparison results of comparators 54-1, . . . , 54-5. In threshold value adjusting circuit 50A shown in FIG. 7, since the comparison results for voltages K1·Vin, . . . , K5·Vin and voltage α·Vout can be obtained at the same time, threshold value signal Sth can be generated faster than threshold value adjusting circuit 50 shown in FIG. 3.

Figure 8:
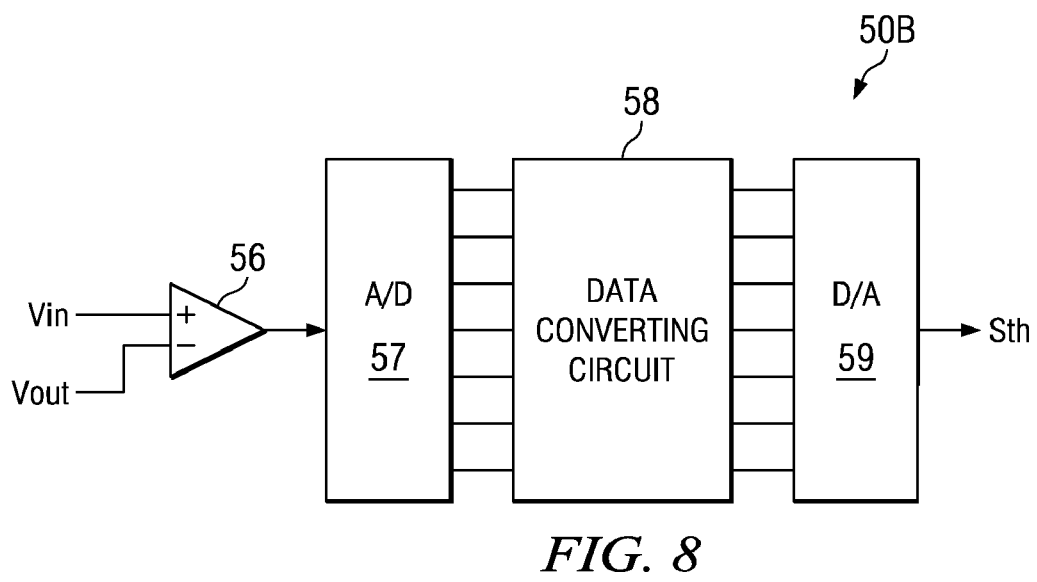
FIG. 8 is a diagram illustrating a second modification example of the threshold value adjusting circuit.

FIG. 8 is a diagram illustrating a second modification example of the threshold value adjusting circuit. In threshold value adjusting circuits 50, 50A shown in FIGS. 3, 7, threshold value signal Sth is generated corresponding to the ratio between input voltage Vin and output voltage Vout. As shown in FIG. 8, however, threshold value signal Sth is generated corresponding to the difference between input voltage Vin and output voltage Vout.

Threshold value adjusting circuit 50B shown in FIG. 8 has amplification circuit 56, analog/digital converter 57, data converting circuit 58, and digital/analog converting circuit 59. Amplification circuit 56 amplifies the difference between input voltage Vin and output voltage Vout. Analog/digital converter 57 converts the output signal of amplification circuit 56 into a digital signal. Data converting circuit 58 converts the digital signal output from analog/digital converter 57 into threshold value data. For example, it is constituted with a memory that stores the threshold value data corresponding to the value of the output signal of analog/digital converter 57. Digital/analog converter 59 converts the threshold value data output from data converting circuit 58 into analog threshold value signal Sth.

The claimed invention is not limited to the disclosed embodiments. Those skilled in the art to which the invention relates will appreciate that many other embodiments and modifications exist for implementation of the principles of the claimed invention.

In described embodiments, a step-up/down circuit is used as switching converter circuit 10. However, switching converter circuit 10 may have other configurations. Consequently, a step-up converter circuit can be used if the lower limit of the input voltage is higher than the target value of the output voltage. A step-down converter circuit can be used if the upper limit of the input voltage is lower than the target value.

In current judging circuit 40 shown in FIG. 2, the current of inductor L1 is detected by the on voltage of MOS transistor Q1. It is also possible to detect the current flowing through diode D1. Also, an element with a very small resistance can be set in the path of the current of inductor L1, and the current of inductor L1 is detected based on the voltage generated across said element.

In described embodiments, output voltage Vout and input voltage Vin are divided and compared. The present invention is not restricted to this approach. For example, in the case of step-down operation alone, output voltage Vout can be compared directly without being divided with the voltage divided by voltage dividing circuit 51. Also, since the output voltage Vout is constant in the normal state, it is also possible to use a certain reference voltage corresponding to the target value of output voltage Vout instead of a voltage obtained by dividing output voltage Vout. Also, in implementation of the present invention, it is also possible to use a MOS transistor that is turned on/off by control signal generating circuit 65 instead of diode D1.

The invention claimed is:

1. A switching power supply device, comprising:
    a switching converter circuit having at least one inductor, and being configured, adapted and connected to alternate repeatedly between a first state for storing power input from an input terminal in said inductor and a second state for discharging the power stored in said inductor from an output terminal, to step up or down DC voltage applied to said input terminal as a result of said repeated operation, and to output said stepped up or down voltage at said output terminal;
    a control circuit configured, adapted and connected to set said switching converter circuit into said second state when the voltage at said output terminal is higher than a target value, and returning said switching converter circuit to said second state after it has been set into the first state for a prescribed period of time when the voltage at said output terminal is lower than the target value, and to set said switching converter circuit into said second state when the current of said inductor is larger than a threshold value; and
    a threshold value adjusting circuit configured, adapted and connected to adjust said threshold value corresponding to the ratio or difference between the voltage at said input terminal and the voltage at said output terminal, so that the variation in the ripple voltage occurring at said output terminal in company with the variation in said ratio or difference is reduced.

2. A switching power supply device as in claim 1, further comprising:
    a first judging circuit configured, adapted and connected to determine whether the current of said inductor is larger than the threshold value corresponding to an input threshold value signal;
    and wherein said threshold value adjusting circuit includes:
    a first voltage dividing circuit configured, adapted and connected to divide the voltage at said input terminal based on plural voltage dividing ratios;
    a comparator configured, adapted and connected to compare each of the plural voltages divided by said first voltage dividing circuit with the voltage at said output terminal or a prescribed voltage; and
    a signal generating circuit configured, adapted and connected to generates said threshold value signal based on the comparison result of the comparator.

3. A switching power supply device as in claim 2, further comprising a selecting circuit configured, adapted and connected to select one voltage sequentially from the plural voltages divided by said first voltage dividing circuit;
    wherein said comparator is further configured, adapted and connected to sequentially compare the voltage selected by said selecting circuit with the voltage at said output terminal or a prescribed voltage; and
    wherein said signal generating circuit is further configured, adapted and connected to generate said threshold value signal based on the plural comparison results of said comparator corresponding to the plural voltages divided by said first voltage dividing circuit.

4. A switching power supply device as in claim 2, further comprising a second voltage dividing circuit configured, adapted and connected to divide the voltage at said output terminal; and
    wherein said comparator is further configured, adapted and connected to compare each of the plural voltages divided by said first voltage dividing circuit with the voltage divided by said second voltage dividing circuit.

5. A switching power supply device as in claim 1, further comprising a judging circuit configured, adapted and connected to determine whether the voltage at said output terminal is lower than said target value;
    and wherein said control circuit includes:
    a signal holding circuit configured, adapted and connected to hold a signal with a first value when it is found by said first judging circuit that the voltage at said output terminal is lower than said target value, and to reset that signal to a second value periodically in synchronization with an input clock signal; and
    a control signal generating circuit configured, adapted and connected to generate a control signal which sets said switching converter circuit to said first state when said signal holding circuit holds a signal with the first value, and which sets said switching converter circuit to said second state when said signal holding circuit holds a signal with a second value.

6. A switching power supply device as in claim 5, further comprising another judging circuit configured, adapted and connected to determine whether the current of said converter is larger than said threshold value;

and wherein said signal holding circuit is further configured, adapted and connected to hold said second value during the period until said reset operation is performed at least once when it is found by said another judging circuit that the current of said inductor is larger than said threshold value.

7. A switching power supply device as in claim 1, wherein said switching converter circuit includes:

a first switching element connected between one of the terminals of said inductor and said input terminal;

a second switching element connected between said one of the terminals of said inductor and a reference potential;

a third switching element connected between the other terminal of said inductor and said output terminal; and a fourth switching element connected between the other terminal of said inductor and said reference potential;

and wherein said control circuit is further configured, adapted and connected to:

turn on the first and the third switching elements and turn off the second and the fourth switching elements in said first state, and turn on the second and the third switching elements and turn off the first and the fourth switching elements in said second state, when the voltage at said input terminal is higher than the voltage at said output terminal; and turn on the first and the fourth switching elements and turn off the second and the third switching elements in said first state, and turn on the first and the third switching elements and turn off the second and the fourth switching elements in said second state, when the voltage at said input terminal is lower than the voltage at said output terminal.

8. A control device for a switching converter circuit which includes at least one inductor and alternately repeats a first state for storing the power input from an input terminal in said inductor and a second state for discharging the power stored in said inductor from an output terminal, steps up or down a DC voltage applied to said input terminal as a result of said repeated operation, and outputs that voltage from said output terminal, comprising:

a control circuit configured adapted and connected to set said switching converter circuit into said second state when the voltage at said output terminal is higher than a target value, and returning said switching converter circuit to said second state after it has been set into the first state for a prescribed period of time when the voltage at said output terminal is lower than the target value, and to set said switching converter circuit into said second state when the current of said inductor is larger than a threshold value; and a threshold value adjusting circuit configured, adapted and connected to adjust said threshold value corresponding to the ratio or difference between the voltage at said input terminal and the voltage at said output terminal, so that the variation in the ripple voltage occurring at said output terminal in company with the variation in said ratio or difference is reduced.

9. A method for switching a power supply, comprising:

alternating a switching converter circuit having at least one inductor repeatedly between a first state for storing the power input from an input terminal in said inductor and a second state for discharging the power stored in said inductor from an output terminal, to step up or down DC voltage applied to said input terminal as a result of said repeated operation, and to output said stepped up or down voltage at said output terminal;

controlling said switching converter circuit to set it into said second state when the voltage at said output terminal is higher than a target value, and to return said switching converter circuit to said second state after it has been set into the first state for a prescribed period of time when the voltage at said output terminal is lower than the target value, and to set said switching converter circuit into said second state when the current of said inductor is larger than a threshold value; and adjusting said threshold value corresponding to the ratio or difference between the voltage at said input terminal and the voltage at said output terminal, so that the variation in the ripple voltage occurring at said output terminal in company with the variation in said ratio or difference is reduced.

10. A method as in claim 9, further comprising:

determining whether the current of said inductor is larger than the threshold value corresponding to an input threshold value signal;

and wherein said threshold value adjusting includes:

dividing the voltage at said input terminal based on plural voltage dividing ratios;

comparing each of the plural divided voltages with the voltage at said output terminal or a prescribed voltage; and generating said threshold value signal based on the comparison result of the comparator.

11. A method as in claim 10, further comprising selecting one voltage sequentially from the plural divided voltages;

wherein said comparing is done to sequentially compare the selected voltage with the voltage at said output terminal or a prescribed voltage; and wherein said generating is done to generate said threshold value signal based on the plural comparison results corresponding to the plural divided voltages.

12. A method as in claim 10, further comprising dividing the voltage at said output terminal; and wherein said comparing is done to compare each of the plural divided voltages with the voltage divided at said output terminal.

13. A method as in claim 9, further comprising determining whether the voltage at said output terminal is lower than said target value;

and wherein said controlling includes:

holding a signal with a first value when it is found that the voltage at said output terminal is lower than said target value, and resetting that signal to a second value periodically in synchronization with an input clock signal; and generating a control signal which sets said first state when a signal with the first value is held, and which sets said second state when a signal with a second value is held.

14. A method as in claim 13, further comprising determining whether the current of said inverter is larger than said threshold value;

and wherein said second value is held during the period until said reset operation is performed at least once when it is found that the current of said inductor is larger than said threshold value.

* * * * *